United States Patent [19]

Caridis et al.

[11] 4,392,420
[45] Jul. 12, 1983

[54] RECIRCULATING HOT OIL COOKING APPARATUS

[75] Inventors: Andrew A. Caridis, Foster City; Clark K. Benson, Millbrae, both of Calif.

[73] Assignee: Heat & Control, Inc., So. San Francisco, Calif.

[21] Appl. No.: 353,337

[22] Filed: Mar. 1, 1982

Related U.S. Application Data

[63] Continuation of Ser. No. 222,744, Jan. 5, 1981, abandoned.

[51] Int. Cl.³ .............................................. A47J 37/12
[52] U.S. Cl. ...................................... 99/406; 99/352; 99/355; 426/438
[58] Field of Search ................. 99/330, 352, 355, 404, 99/405, 406, 407, 409, 339, 443 C, 403; 426/438

[56] References Cited

U.S. PATENT DOCUMENTS 3,309,981 3/1967 Benson .................................. 99/405

FOREIGN PATENT DOCUMENTS

123212 1/1947 Australia .............................. 99/404
2724280 5/1977 Fed. Rep. of Germany ........ 99/407

Primary Examiner—Billy J. Wilhite
Attorney, Agent, or Firm—Flehr, Hohbach, Test, Albritton & Herbert

[57] ABSTRACT

A recirculating hot oil cooking apparatus for animal or vegetable product pieces which includes flow direction altering mechanisms in front of and behind the product entry zone of the cooker to substantially eliminate eddy currents and improve movement of raw product pieces from the product entry zone toward the product exit zone without product clumping.

19 Claims, 8 Drawing Figures

RECIRCULATING HOT OIL COOKING APPARATUS

This is a continuation of application Ser. No. 222,744 filed Jan. 5, 1981, now abandoned.

This invention relates generally to high volume, industrial cooking apparatus and, more particularly, to high volume, recirculating hot oil cooking apparatus used for animal or vegetable product pieces.

Large industrial type recirculating hot oil cookers for animal or vegetable product pieces have been available in the art for several years. Generally these cookers utilize in elongated pan assembly which contains a volume of hot oil flowing between a product entry zone located near the front wall of the pan and a product exit zone located near the rear wall of the pan. The product entry zone is established near the front wall of the pan assembly whereat raw product pieces are introduced into the stream of oil. Typically a take-off conveyor means is provided at the product exit zone for removing the product pieces after they have been carried thereto in the oil stream and completely cooked. A sump is formed in the bottom of the pan assembly near the product exit zone for withdrawing oil from the pan assembly and an inlet header assembly is provided adjacent the front wall of the pan assembly for supplying hot oil thereto at the product entry zone. The inlet header assembly includes an inlet feed jet which extends substantially across the front wall of the pan assembly to supply a substantially uniform stream of oil at a substantial velocity across a surface region of the product entry zone. A pump and heat exchanger arrangement are coupled between the sump and the inlet header for recirculating reheated oil therebetween and to maintain the flowing volume of hot oil in the pan assembly. Between the product entry zone and the product exit zone are typically provided a number of paddle wheels for submerging and turning the product pieces and controlling the rate of flow of the pieces through the pan assembly. Toward the rear of the cooking assembly just prior to the product exit zone a submerger conveyor is provided for maintaining the product pieces which are now light enough to float on the cooking oil in a submerged condition to complete the cooking process.

In prior art industrial cookers of the type described above, the inlet stream of oil provided by the inlet feed jet is relied on to promptly coat the individual product pieces with hot cooking oil and to start the movement of the pieces away from the product entry zone toward the product exit zone. One of the problems that is encountered in relying on this initial stream of oil for this purpose is that the surface stream of oil tends to produce recirculating eddy currents in the oil within the product entry zone. Furthermore, the surface stream of inlet oil tends to produce a dead zone at the front portion of the product entry zone underneath the inlet feed jet. The combination of these recirculating eddy currents and dead oil zones tend to cause substantial numbers of individual product pieces to clump together and remain in the product entry zone, producing a clump which is cooked on the outside but remains substantially uncooked on the inside. Eventually this clump of product leaves the product entry zone and flows with the stream of oil toward the product exit zone. Even if this clump tends to partially or completely break up as it traverses the pan assembly of the cooker, the inside surfaces of the clump will tend to be undercooked and the outside surfaces will tend to be overcooked, producing a defective product. Consequently, inspectors at the end of the takeoff conveyor are required to inspect the product and remove the defective pieces before the product is packaged. The cost of inspecting the product and removing these defective pieces together with the cost of the waste pieces themselves tends to drive up the overall manufacturing cost of the product. The art has attempted to break up these clusters by using rotating wobble disks in a central region of the pan assembly to agitate the oil and the pieces in that area. This attempted solution to the clumping problem has been, at best, minimally successful.

Accordingly, it is a principal object of this invention to provide an improved recirculating hot oil cooking assembly.

It is another object of this invention to provide an improved recirculating hot oil cooking assembly having improved movement of product pieces from a product entry zone toward a product exit zone.

It is a further object of this invention to provide a recirculating hot oil cooking assembly with improved oil flow characteristics to reduce clumping of product pieces.

In accordance with one aspect of this invention, the abovestated objects are achieved in a recirculating hot oil cooking assembly which includes an elongated pan assembly having front, rear, bottom and side walls for containing a volume of hot oil flowing between a product entry zone located near the front wall and adapted to receive product pieces in raw form and a product exit zone located near the rear wall and adapted to discharge said product pieces after cooking. A sump is formed in the bottom of the pan near the product exit zone for withdrawing oil from the pan assembly and an inlet header assembly is provided for supplying hot oil to the pan assembly at the product entry zone. The inlet header assembly includes an inlet feed jet extending substantially across the front wall of the pan assembly underneath the surface of the volume of oil to supply a substantially uniform stream of oil at a substantial velocity across a surface region of the product entry zone. A pump and heat exchanger assembly are coupled between the sump and the inlet header for recirculating reheated oil therebetween to establish the flowing volume of hot oil in the pan assembly. A flow directing means is mounted adjacent the product entry zone of the pan assembly for repetitively altering the localized flow direction of the volume of hot oil to reduce recirculating eddy currents in the oil at the product entry zone. This improves the movement of the product pieces away from the product entry zone towards the product exit zone and reduces clumping of raw product pieces in the product entry zone.

In one version of this invention the flow directing means is mounted behind the product entry zone and comprises a shaft rotatably mounted between the side walls of the pan with a plurality of fin means mounted at spaced locations on the shaft and at a preselected non-normal angular orientations to the axis thereof. Means are provided for producing a repetitive rotation of the shaft and the fin means which in turn causes alteration in the flow direction of a volume of oil moving through an associated zone and tends to break up any recirculating eddy currents which might otherwise be created in that zone.

In accordance with another aspect of this invention the flow directing means is mounted immediately adjacent the inlet feed jet in front of the product entry zone. In this case the flow directing zone comprises a plurality of flow directing fin means with means mounting the fin means at spaced locations across the length of the inlet feed jet. In addition, means operatively associated with the mounting means are provided for producing repetitive alteration of the angular orientation of the fin means with respect to the direction of the stream of oil from the inlet feed jet for repetitively altering the flow direction of the hot oil stream across the product entry zone of the pan assembly.

In a preferred embodiment, the flow directing means includes both a first flow directing assembly mounted in the pan assembly at the rear of the product entry zone and a second flow directing assembly mounted adjacent the inlet feed jet in front of the product entry zone. The first flow directing assembly repetitively alters the localized flow direction of the volume of hot oil leaving the product entry zone and the second flow directing assembly repetitively alters the flow direction of the hot oil stream across the product entry zone. The two flow directing assemblies cooperate to eliminate recirculating eddy currents in the oil throughout the product entry zone and adjacent regions to provide a consistent movement of the vegetable product pieces away from the product entry zone toward the product exit zone and thereby substantially eliminate clumping of raw product pieces in the product entry zone. Each of the flow directing assemblies may consist of a shaft rotatably mounted between the side walls of the pan assembly with a plurality of fin means mounted at spaced locations on the shaft and at preselected non-normal angular orientations to the axis of the shaft. The fin means preferably consist of substantially circular disks which are mounted to the associated shaft at substantially similar non-normal angular orientations and coaxial with the shaft. The shaft of the first flow directing assembly is preferably mounted above the surface of the stream of oil in order to avoid any blocking of the oil flow at that location. The shaft of the second flow directing assembly is preferably mounted below the inlet feed jet with the fins or disks mounted thereon extending into the stream of hot oil communicated into the pan assembly from the inlet feed jet.

The hot oil cooking assembly of this invention substantially reduce the quantity of defective product pieces produced during the cooking operation. Consequently, utilizing the apparatus of this invention a number of inspectors examining the product output may be reduced and the overall cost of producing the product is lowered. Other objects, features, and advantages of this invention will be apparent from a consideration of the following detailed description in conjunction with the accompanying drawings.

Figure 1:
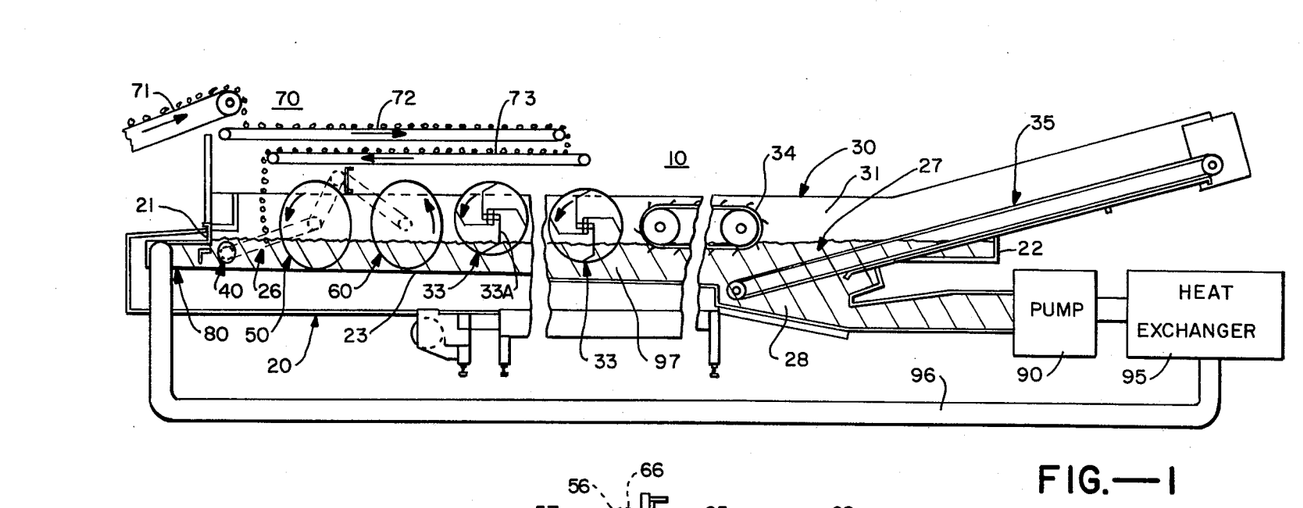
FIG. 1 is a partly sectioned elevational view of a recirculating hot oil cooking apparatus in accordance with this invention.
Figure 2:
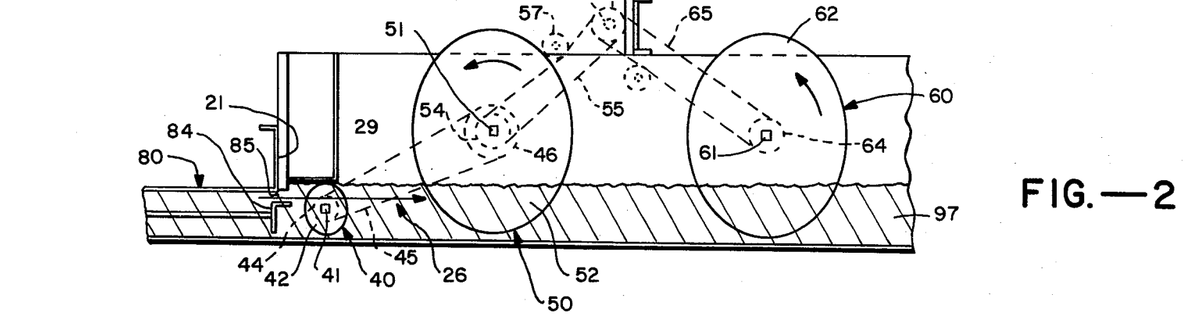
FIG. 2 is an enlarged cross sectional view of a portion of the cooking apparatus of FIG. 1 illustrating details of the structure of this invention.
Figure 3:
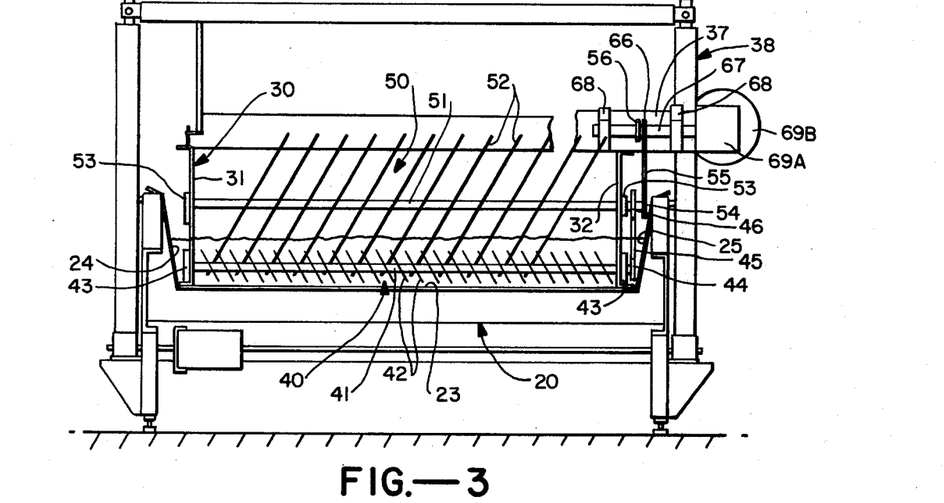
FIG. 3 is a partly sectioned front elevation view of cooking apparatus in accordance with this invention.

Referring now to FIGS. 1 and 3, the general overall structure of a recirculating hot oil cooking apparatus which incorporates the improvements of this invention will be discussed. The basic elements of the overall cooking apparatus are a shallow pan assembly 20, a cooking conveyor system 30 which fits into the pan assembly 20, an overhead conveyor system 70 which mounts over the pan assembly 20 and the cooking conveyor assembly 30 to convey product into the pan assembly 20. A pump 90 and heat exchanger 95 are provided for withdrawing oil from a sump 28 formed in the bottom of pan assembly 20 and reheating the oil in the heat exchanger 95 before returning it via a return pipe 96 to the inlet header arrangement 80 associated with pan assembly 20.

Pan assembly 20 is basically an insulated, elongated pan which may be constructed of stainless steel or black iron and has a front wall 21, a back wall 22, a bottom wall 23, and side walls 24 and 25. For purposes of illustration the product to be cooked in the cooking apparatus will be assumed to be potato chips, but it should be understood that other animal or vegetable product pieces such as corn chips, tortilla chips, pork rinds and the like could be cooked in this same type of cooking apparatus. A product entry zone 26 is established at the front end of the pan assembly 20 and a product exit zone 27 is established near the rear end of the pan assembly 20. A continuous flow of hot cooking oil occurs between the product entry zone 26 and the product exit zone 27 due to the action of the pump 90 recirculating the oil between the sump 28 and the inlet header assembly 80. The details of the inlet header assembly will be described in conjunction with a later drawing figure.

As shown in FIG. 1 the cooking conveyor assembly 30 has a pair of side walls 31 and 32 which form a channel for the hot cooking oil flowing between the product entry zone 26 and the product exit zone 27 in pan assembly 20. In other words, the sides 31 and 32 of the cooking conveyor assembly 30 become the actual cooking pan sides although the hot cooking oil liquid in pan assembly 20 fills the regions between the side walls 31 and 32 of the conveyor assembly 30 and the side walls 24 and 25 of the pan assembly 20.

The conveyor assembly 30 further includes a plurality of paddle wheels 33 which extend between the side walls 31 and 32 of the cooking conveyor assembly 30. In FIG. 1 only two of the paddle wheels 33 are shown but it should be understood that as many as four to six of such paddle wheels will be included on the cooking conveyor system 30 depending on the length of the cooking pan. Each of the paddle wheels 33 is rotatably mounted between the side walls 31 and 32 and includes four paddles 33A. These paddle wheels were utilized in prior art cooking apparatus and basically function to control the residence time of the potato slices in this initial cooking zone of the paddle wheels and to repeatedly turn and submerge the chips in the hot cooking oil as they flow with the current of oil from the product entry zone 26 toward the product exit zone 27. At some point during the cooking cycle of the potato slices, the water content of the slices has been reduced to the point that they tend to float. The paddle wheel assemblies 33 push the floating slices down into the oil to assure even cooking of both sides in this zone. The paddle wheels are rotated by a motor (not shown) which drives a sprocket and chain arrangement (not shown) coupled to each of the paddle wheels to provide continuous rotation thereof at a prearranged rate.

The cooking conveyor assembly 30 further includes a submerger conveyor 34 mounted between the side walls 31 and 32. The submerger conveyor assembly 34 is another conventional assembly in the prior art cooking apparatus and functions to keep the buoyant potato slices submerged below the surface of the oil to complete the cooking thereof prior to entering the product exit zone 27. The cooking conveyor assembly 30 also includes a product removal and draining conveyor 35 which removes the cooked potato chips from the product exit zone 27. The product removal conveyor 35 is a wire mesh conveyor belt system which permits draining of the excess oil off of the product as it is slowly withdrawn from the cooking oil. A separate motor and drive arrangement (not shown) for the withdrawal conveyor 35 is provided. This withdrawal conveyor typically operates at a relatively slow speed so that a three or four inch pack of cooked potato chips will be riding on the product withdrawal conveyor as the chips leave the product exit zone 27.

At the exit end of the product withdrawal conveyor 35, the cooked potato chips are typically dropped onto another conveyor where any defective overcooked chips or uncooked clumps of chips are removed by inspectors prior to packaging.

To convey the raw potato slices into the pan assembly of the cooking apparatus, an overhead conveyor system 70 is provided. Typically this overhead conveyor system includes an inlet conveyor 71 which brings the raw slices from peeling, slicing, and washing apparatus into the front end of the cooking assembly and dumps the raw slices onto a first conveyor 72 which extends the width of the cooking conveyor assembly 30 and runs along for about one-half the overall cooking zone of the cooking apparatus. Thereafter the slices are dumped onto a second conveyor 73 which returns them to the area above the product entry zone 26 of the pan assembly 20 where the raw slices fall off the end of the conveyor 73 system into hot oil at the product entry zone 26. In traversing the conveyors 72 and 73 the slices are partially cooked and partially coated with a mist of oil. This is an optional arrangement which is provided to conserve energy by utilizing some of the heat escaping from the hot oil in the pan assembly to slightly precook the chips. Although this is a useful energy conservation measure, it makes the chips entering the product entry zone 26 have a greater tendency to clump together.

Two flow directing assemblies 40 and 50 are provided adjacent the product entry zone 26 in accordance with this invention and substantially preclude the forming of clumps of uncooked slices in the product entry zone. The detailed structure and function of these flow directing assemblies will be described in detail below. A third flow directing and oil agitating assembly 60 is also provided in accordance with this invention and will also be described below.

In prior art cooking apparatus of this type the product entry zone 26 does not contain any type of flow directing means, and the apparatus relies solely on the creation of a surface stream of hot oil by an inlet feed jet in the header assembly 80 to rapidly and thoroughly coat the entering potato slices with hot oil and to start the slices moving away from the product entry zone 26 toward the product exit zone 27. Where the third flow directing assembly 60 is shown in FIG. 1, a paddle wheel assembly having just two paddles on it was conventionally furnished in prior art cooking apparatus. As previously discussed, in this prior art cooking apparatus, the surface jet of oil at the product entry zone 26 would tend to create both recirculating eddy currents and low pressure, low flow regions or dead zones underneath the inlet feed jet which would tend to retain some of the potato slices in the product entry zone for an undesired period of time during which they would tend to clump together with the outside surfaces cooking but the inside surfaces remaining uncooked. Eventually these clumps of potato slices would move out of the product entry zone and would traverse the length of the pan assembly 20 and exit on the withdrawal conveyor 35. However, even if some of the portions of this clump were to break off as it traversed the length of the pan assembly, portions of the chip would not be sufficiently cooked and, depending on how long the clump remained in the product entry zone, outer portions of the chip might be overcooked. These defective clumps of chips and undercooked or overcooked slices have to be removed by inspectors on the output conveyor fed by the withdrawal conveyor 35.

Typically in the prior art cooking apparatus a hood or a cover (not shown) is provided over the pan assembly 20 to confine the fumes escaping during the cooking process. The hood typically also includes a flue which is connected to a chimney for exhausting the steam and other gasses which are created during the potato chip cooking process. As shown in FIG. 3 the cooking apparatus also includes a screw-type hoist arrangement 38 which may be utilized to lift the cooking conveyor assembly 30 out of the pan assembly 20.

As previously indicated one of the basic concepts of this invention involves the provision of a flow directing means mounted adjacent the product entry zone of the pan assembly for repetitively altering the localized flow direction of the volume of hot oil to reduce recirculating eddy currents in the oil in the product entry zone. One version of this invention would involve simply mounting the first flow directing assembly 50 at the rear portion of the product entry zone 26 for repetitively altering the localized flow direction of the volume of hot oil in this area. It has been found that by changing the flow direction of the hot oil within this region or zone of the pan assembly 20, the recirculating eddy currents which would otherwise tend to build up in the product entry zone 26 are substantially reduced so that improved movement of the individual potato chips away from the product entry zone 26 toward the product exit zone 27 is produced. The precise basis for this improvement in product movement is not completely understood, but it is believed that the repetitive alteration of the flow direction of the hot oil in this zone in effect causes a constantly changing distribution of the currents which would otherwise form eddies. In other words, by preventing steady state current flow through this zone the tendency for recirculating eddy currents to form is substantially reduced.

It has also been found effective to position a flow directing assembly such as flow directing assembly 40 immediately in front of the inlet feed jet which creates the surface stream of hot oil within the product entry zone 26. Utilizing a flow directing means at this location for repetitively altering the localized flow direction of the hot oil in the surface stream also tends to eliminate the recirculating eddy currents which would otherwise be created in the product entry zone 26. In a preferred embodiment both of the flow directing assemblies 40 and 50 are provided to take advantage of the cumulative improvement in movement of the potato chip pieces out of the product entry zone 26 which are contributed by each assembly. In other words, although each flow directing assembly by itself substantially improves the movement of potato slices out of the product entry zone, the combination of the two flow directing assemblies produces a cumulative improvement in the product movement. It has also been found advantageous to add a third flow directing assembly 60 behind the flow directing assembly 50 to further agitate the volume of hot oil in the zone associated with that flow directing assembly. As will later be discussed these flow directing assemblies can take various forms with the basic function of the flow directing assembly being to alter the localized flow direction of the hot oil passing through the associated zone to improve the movement of the potato slices and thus to reduce the tendency to clump and to substantially eliminate the problem of defective chip clumps and improperly cooked chips leaving the cooking apparatus on the withdrawal conveyor 35.

Figure 4:
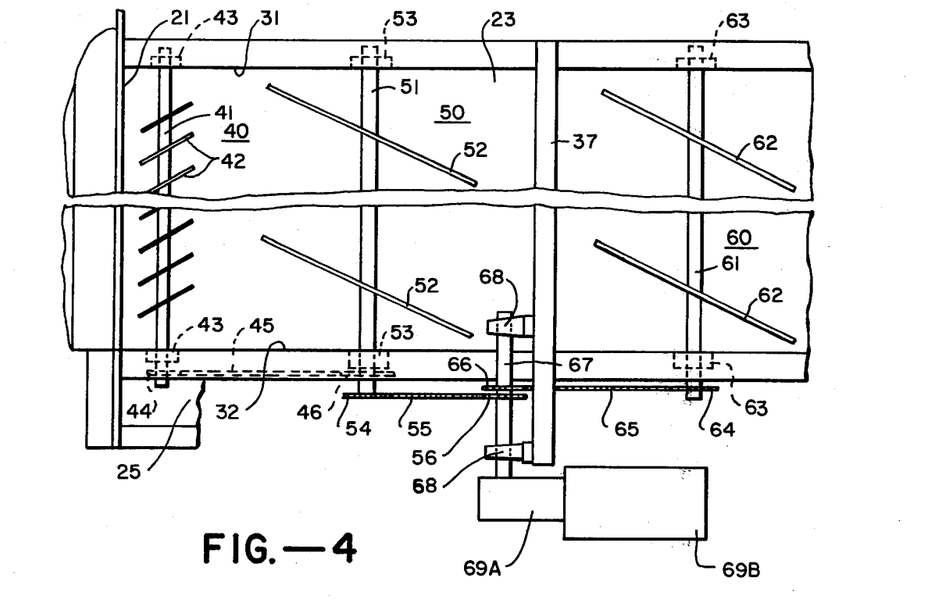
FIG. 4 is a partial top plan view of cooking apparatus in accordance with this invention.

FIGS. 2, 3, 4, and 6 illustrate the structure and placement of a preferred form of flow directing assembly 40. As illustrated flow directing assembly 40 includes a square shaft 41 on which fin means in the form of a large number of circular disks 42 are mounted at spaced locations. The shaft 41 is mounted between the sides 31 and 32 of the cooker conveyor assembly 30 utilizing bearing mounts 43. A sprocket 44 is mounted on one end of the shaft 41 and coupled by a chain to a sprocket 46 mounted on shaft 51 of the second flow directing assembly 50. Shaft 51 is caused to rotate by a sprocket and chain drive arrangement operating off of gear box 69A and motor 69B as shown in FIG. 4.

The individual flow diverting disks 42 may be mounted in any convenient fashion on shaft 41. For example, the disks may have a rectangular mounting aperture formed in the center thereof so that they may slip over the square shaft 41 and be welded in place thereon. Conveniently, as illustrated in FIGS. 3 and 4, the disks 42 may be mounted on a shaft at about a thirty degree angle. The particular angle of the disks does not appear to be critical, but it is preferable to keep the angle within the range of about twenty to thirty-five degrees. Shallower angles under twenty degrees tend to produce insufficient alteration of the flow direction and angles larger than about thirty-five degrees tend to divert the stream of oil exiting the inlet jet region 85 (FIG. 6) too much toward the sides of the cooking pan assembly. In addition, the spacing between individual circular disks 42 does not appear to be critical. A convenient spacing is about three inches but spacings between about two and a half and four inches will also produce the beneficial result of this flow directing assembly. It has been found preferable to rotate the shaft 41 and the disk 42 thereon at about 60 rpm. However, there is nothing critical about the rotation rate of this assembly and rotation speeds in the range of about 40 to about 80 rpm will produce generally satisfactory results.

Figure 5:
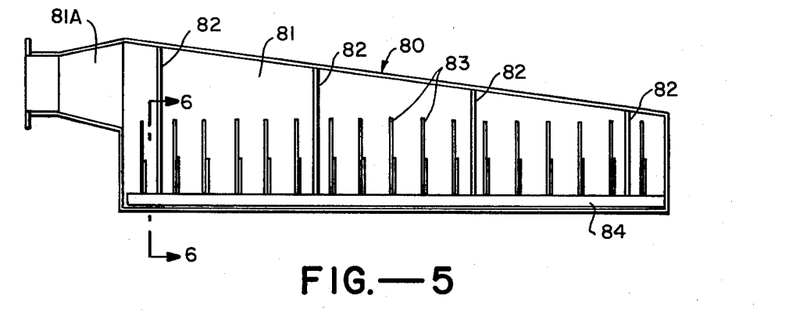
FIG. 5 is a section view through an inlet header assembly of a cooking apparatus in accordance with this invention.
Figure 6:
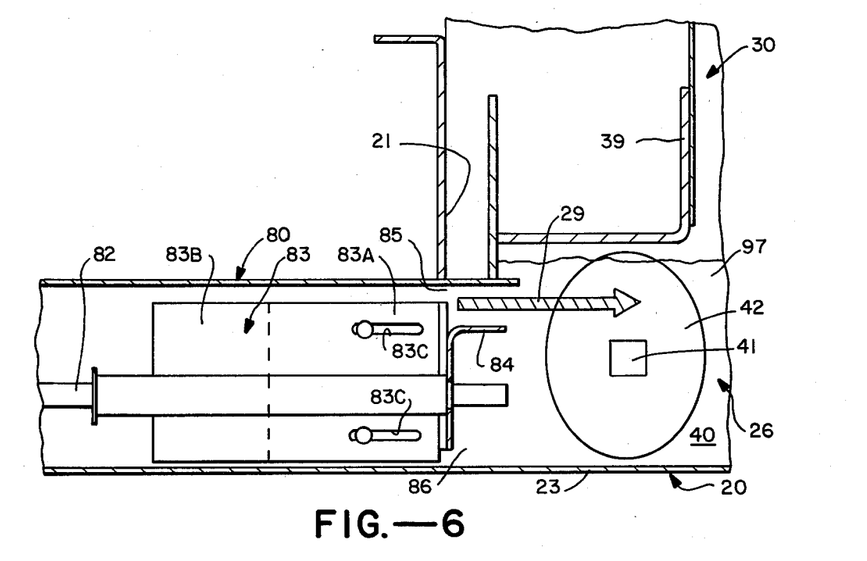
FIG. 6 is an enlarged section view of a portion of cooking apparatus in accordance with this invention.

FIG. 6 shows the placement of the first flow directing assembly 40 with respect to the inlet jet 85 associated with the inlet header assembly 80 at the front wall 21 of the pan assembly 20. The inlet header 80 which is depicted in FIGS. 5 and 6 may take a number of different forms, but its basic function is to produce a relatively uniform flow of the recirculated hot cooking oil through the inlet feed jet 85 which extends substantially across the full width of the front wall 21 of the pan assembly 20. As shown in FIG. 5 and 6, an exemplary version of an inlet header assembly 80 utilizes a side entry port 81A to communicate the recirculated and reheated cooking oil into inlet header 81. A plurality of diverting fins 83 are mounted within the header 81 utilizing a plurality of rods 82 which extend between the back wall of the header 81 and the jet forming wall 84. The flow diverting fins 83 are shown as adjustable structures so that the length of each diverting fin may be adjusted to provide the desired uniform flow characteristics across the width of the inlet jet 85. Each of the adjusting plates 83B is adjustable with respect to fixed plates 83A utilizing a nut and bolt arrangement in the slots 83C. Various other inlet header structures could be utilized to achieve the basic desired result of the substantially uniform flow at a substantial velocity through the inlet feed jet 85.

As shown in FIG. 6, the inlet feed jet 85 is positioned just beneath the surface of the volume of oil 97 within the pan assembly 20. Preferably the velocity of the inlet oil stream designated by the arrow 29 is about four feet per second. With this stream velocity the potato slices entering the product entry zone 26 will be quickly coated with oil as they enter the oil bath 97. As shown in FIG. 6, a cover arrangement 39 is mounted to the cooking conveyor assembly 30 in order to cover the first flow directing assembly 40. By rotating the shaft 41 and the disks 42 thereon at a rate of about 60 rpm, the stream of oil 29 is rapidly and repetitively caused to change its direction through the product entry zone 26. In addition, the rapid rotation of the disks 42 causes an agitation of the oil in the area of the disks and particularly in the area underneath the inlet feed jet 85 where a dead cooking oil zone would otherwise tend to be produced. Consequently, in addition to the elimination of the tendency of this inlet oil stream to create recirculating eddy currents, any tendency of the potato slices to be recirculated back behind the flow diverting assembly 40 into the dead zone underneath the inlet jet 85 will be eliminated due to the agitation of the oil in this region.

Figure 7:
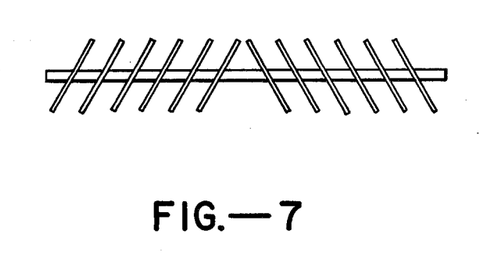
FIG. 7 is a schematic illustration of a modified pattern of disks.
Figure 8:
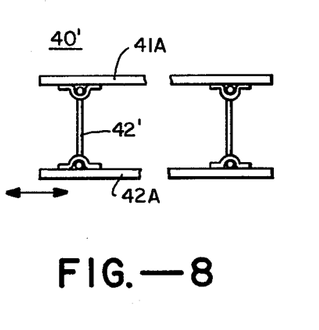
FIG. 8 illustrates an alternative flow directing assembly.

As previously indicated this first flow directing assembly could take several alternative forms. Circular disks 42 depicted in the drawings essentially comprise fin means with the shaft producing a repetitive alteration of the angular orientation of these fin means with respect to the direction of the stream of oil from the inlet feed jet. Any other type of fin means which would produce this same repetitive alteration of the oil stream could be utilized. For example, instead of the circular disks, elliptical disks could be utilized. Furthermore, instead of orienting all of the disks at the same angle, the herringbone pattern illustrated schematically in FIG. 7 of the drawings could be employed. The fins could also be discontinuous array of fins mounted to the shaft rather than the continuous disk type of fin. In addition, FIG. 8 illustrates an alternative flow directing assembly 40' with fins 42' rotatably mounted on each end to a stationary bar 41A and a reciprocating bar 42A. Many other versions of suitable flow directing means could also be employed to achieve the purpose of that assembly.

The flow directing assembly 50 mounted behind the product entry zone 26 comprises essentially the same type of structure and mounting arrangement as the flow directing assembly 40 except that the shaft 51 is mounted to the sides 31 and 32 of the cooking conveyor assembly using bearings 53 which mount the shaft at a position above the surface of the volume of cooking oil 97 in the pan assembly 20. Larger circular disks 52 are mounted on shaft 51 at spaced locations which are generally twice the space between the disks 42 on the shaft 41. The radius of the disks 52 is made large enough such that a substantial portion of the surface of the disk will be submerged in the cooking oil as the shaft 51 and disks 52 rotate. A sprocket and drive chain arrangement involving sprocket 54, drive chain 55, and a sprocket 56 are provided for rotating the shaft 51 with the disks mounted thereon. The sprocket 56 turns on a shaft 67 which is journaled in bearings 68 and driven by a gear box 69A which is in turn driven by a motor 69B.

The disks 52 are mounted in any convenient manner on the shaft 51 such as by forming a rectangular aperture at the center of each disk, slipping it into place over the square shaft 51 and welding the disk at the preselected angle and appropriate location on the shaft 51. The disks 52 are preferably spaced about six inches apart and mounted at about a twenty-five degree angle. Spacing and the mounting angle are not critical and the disks may be conveniently separated by a distance somewhere in the range of four to eight inches and the angle of the disk can conveniently be arranged within the range of about twenty degrees to thirty degrees. The sprocket and chain drive arrangement for the shaft 51 may be set to rotate the shaft at a rate of about 40 rpm. This rotation rate serves the purpose of periodically and repetitively altering the flow direction of the oil through the zone under the disks behind the product entry zone 26 and to reduce eddy currents in the product entry zone. As with the flow directing assembly 40, various alternative structures for accomplishing the repetitive alteration of the localized flow direction in the vicinity of the flow directing assembly 50 could be utilized. It is preferable, however, not to have a stationary structure submerged within the oil at this point in order to avoid any tendency for the cooking potato slices to lodge against the stationary structure.

The third flow directing assembly 60 consists of a structure and mounting arrangement essentially identical with that of the second flow directing assembly 50. A square shaft 61 has a plurality of circular disks 62 mounted thereon in a convenient manner and at an angle of about twenty-five degrees. Shaft 61 is mounted in a pair of bearing assemblies 63 to the sides 31 and 32 of the cooking conveyor assembly 30. Shaft 61 is also mounted above the level of the cooking oil in the pan assembly with the disks 62 dipping into the pan assembly essentially to the bottom surface 23 thereof. A sprocket and drive chain arrangement 64, 65 is utilized to drive the shaft 61 to rotate at a speed of about 20 rpm. This rotational speed is sufficient to provide a gentle agitation of the cooking oil in the zone of the third flow directing assembly 60.

While the improved cooking apparatus of this invention have been described above in terms of certain preferred and alternative embodiments, it should be apparent to those skilled in this art that numerous modifications could be made in the disclosed embodiments without departing from the scope of this invention as claimed in the following claims.

What is claimed is:
1. In a recirculating hot oil cooking assembly for animal and vegetable product pieces,
   an elongated pan assembly having front, rear, bottom, and side walls for containing a volume of hot oil flowing between a product entry zone located near said front wall and adapted to receive said product pieces in raw form and a product exit zone located near said rear wall and adapted to discharge said product pieces after cooking;
   a sump formed in the bottom of said pan near said product exit zone for withdrawing oil from said pan assembly;
   an inlet header assembly for supplying hot oil to said pan assembly at said product entry zone including an inlet feed jet extending substantially across said front wall of said pan assembly underneath the surface of said volume of oil to supply a substantially uniform stream of oil at a substantial velocity across a surface region of said product entry zone;
   a pump and heat exchanger assembly coupled between said sump and said inlet header for recirculating reheated oil therebetween to establish said flowing volume of hot oil in said pan assembly; and
   flow directing means mounted adjacent said product entry zone of said pan assembly for repetitively altering the localized flow direction of said volume of hot oil to reduce recirculating eddy currents in said oil in said product entry zone, said flow directing means comprising a plurality of fin means positioned at spaced preselected non-normal orientations behind the product entry zone and movable so as to achieve said repetitively alternating localized flow of said hot oil while reducing eddy currents in said oil, said flow directing means additionally including means to repetetively move said fins for such purpose, whereby improved movement of said product pieces away from said product entry zone towards said product exit zone is produced to reduce clumping of raw product pieces in said product entry zone.

2. Apparatus as claimed in claim 1, wherein said flow directing means mounted behind said product entry zone and comprises a shaft, means rotatably mounting said shaft between said side walls of said pan, said plurality of fin means being mounted at spaced locations on said shaft and at preselected non-normal angular orientations to the axis thereof, and said means for moving the same producing a repetitive rotation of said shaft and said fin means.

3. Apparatus as claimed in claim 1, wherein said flow directing means is mounted immediately adjacent said inlet feed jet in front of said product entry zone and comprises a plurality of flow directing fin means, means mounting said fin means at spaced locations across the length of said inlet feed jet, and means operatively associated with said mounting means for producing a repetitive alteration of the angular orientation of said fin means with respect to the direction of said stream of oil from said inlet feed jet for repetitively altering the flow direction of said hot oil stream across said product entry zone of said pan assembly.

4. Apparatus as claimed in claim 1, wherein said flow directing means is mounted immediately in front of said inlet feed jet and comprises a shaft, means rotatably mounting said shaft between said side walls of said pan, a plurality of fin means mounted at spaced locations on said shaft at preselected non-normal angular orientations to the center line thereof, and means for producing a repetitive rotation of said shaft and said fin means thereon.

5. Apparatus as claimed in any of claims 2 or 4, wherein said fin means comprise substantially circular disks mounted to said shaft at substantially similar non-normal angular orientations and coaxial therewith.

6. Apparatus as claimed in claim 1, wherein said flow directing means comprises a first flow directing assembly mounted in said pan assembly at the rear of said product entry zone for repetitively altering the localized flow direction of said volume of hot oil leaving said product entry zone and a second flow directing assembly mounted adjacent said inlet feed jet in front of said product entry zone for repetitively altering the flow direction of said hot oil stream across said product entry zone, said first and second flow directing assemblies cooperating to eliminate recirculating eddy currents in said oil throughout said product entry zone to provide consistent movement of said product pieces away from said product entry zone toward said product exit zone and thereby substantially to eliminate clumping of raw product pieces in said product entry zone.

7. Apparatus as claimed in claim 6, wherein said first flow directing assembly comprises a shaft, means rotatably mounting said shaft between said side walls of said pan assembly, a plurality of fin means mounted at spaced locations on said shaft and at preselected non-normal angular orientations to the axis thereof, and means for producing a repetitive rotation of said shaft and said fin means; and said second flow directing assembly comprises a plurality of flow directing fin means, means mounting said fin means at spaced locations across the length of said inlet feed jet, and means operatively associated with said mounting means for producing a repetitive alteration of the angular orientation of said fin means with respect to the direction of said stream of oil from said inlet feed jet.

8. Apparatus as claimed in claim 6, wherein each of said first and second flow directing assemblies comprises a shaft, means rotatably mounting said shaft between said side walls of said pan, a plurality of fin means mounted at spaced locations on said shaft and at preselected non-normal angular orientations to the axis thereof, and means for producing a repetitive rotation of said shaft and said fin means.

9. Apparatus as claimed in claim 8, wherein said fin means comprise substantially circular disks mounted to an associated shaft at substantially similar non-normal angular orientations and coaxial therewith.

10. Apparatus as claimed in claim 6, wherein said first flow directing assembly comprises a shaft, means rotatably mounting said shaft between said side walls of said pan at a location above the surface of said volume of hot oil, a plurality of substantially circular disks mounted coaxially on said shaft at spaced locations and at preselected non-normal angular orientations to the axis thereof, and means for rotating said shaft and said circular disks mounted thereon, said circular disks each having a radius of a magnitude preselected to cause substantial surface area of said disks to extend through said volume of oil as said disks rotate with said shaft; and said second flow directing assembly comprises a shaft; means rotatably mounting said shaft between said walls of said pan at a location underneath the bottom of said inlet feed jet, a plurality of substantially circular disks mounted coaxially on said shaft at preselected spaced locations and preselected non-normal angular orientations to the axis thereof, and means for rotating said shaft and said circular disks thereon, each of said circular disks having a radius of a magnitude sufficient to extend substantial surface portions of said disks into said stream of hot oil from said inlet feed jet as said disks rotate with said shaft.

11. Apparatus as claimed in claim 6, further comprising a third flow directing assembly mounted in said pan assembly behind said first flow directing assembly for repetitively altering the localized flow direction of a volume of hot oil passing through a zone associated with said third flow directing assembly.

12. Apparatus as claimed in claim 11, wherein said third flow directing assembly comprises a shaft, means rotatably mounting said shaft between side walls of said pan at a location above the surface of said volume of hot oil, a plurality of substantially circular disks mounted coaxially on said shaft at spaced locations and at preselected non-normal angular orientations to the axis thereof, and means for rotating said shaft and said circular disks mounted thereon, said circular disks each having a radius of a magnitude preselected to cause substantial surface area of said disks to extend through said associated volume of oil as said disks rotate with said shaft.

13. In a recirculating hot oil cooker for animal or vegetable product pieces, an elongated pan assembly having front, rear, bottom, and side walls for containing a volume of hot oil flowing between a product entry zone located near said front wall and adapted to receive said product pieces in raw form for cooking and a product exit zone located near said rear wall and adapted to discharge said product pieces after cooking, a sump formed in the bottom of said pan near said product exit area for withdrawing oil from said pan;

an inlet header assembly for supplying hot oil to said pan assembly at said product entry zone and including an inlet feed jet extending across substantially the full width of said front end wall of said pan assembly underneath the surface of said volume of oil to supply a substantially uniform stream of oil at a substantial velocity across said product entry zone;

a pump and heat exchanger assembly coupled between said sump and said inlet header for recirculating reheated oil therebetween to establish said flowing volume of hot oil in said pan assembly;

a first flow directing assembly mounted at the rear of said product entry zone, said first flow directing means comprising a plurality of fin means positioned at spaced preselected non-normal orientations behind said product entry zone so as to repetitively alter the localized flow direction of said volume of hot oil thereat, said first flow directing means including means to repetitively move the same for such purpose; and a second flow directing assembly mounted adjacent said inlet feed jet, said second flow directing means also comprising a plurality of fin means positioned at spaced preselected non-normal orientations adjacent the inlet feed jet and movable so as to repetitively alter the flow direction of said inlet stream of oil across said product entry zone, said second flow directing means likewise including means to repetitively move the same for such purpose, said first and second flow directing assemblies cooperating to eliminate recirculating eddy currents in said product entry zone, whereby consistent movement of said vegetable product pieces away from said product entry zone towards said product exit zone is produced to reduce clumping of raw product pieces in said product entry zone.

14. Apparatus as claimed in claim 13, wherein said first flow directing assembly comprises a shaft, means rotatably mounting said shaft between said side walls of said pan, a plurality of fin means mounted at spaced locations on said shaft at preselected non-normal angular orientations to the axis thereof, and means for producing a repetitive rotation of said shaft and said fin means; and said second flow directing assembly comprises a plurality of flow directing fin means, means mounting said fin means at spaced locations across the width of said inlet feed jet, and means operatively associated with said mounting means for producing a repetitive alteration of the angular orientation of said fin means with respect to the direction of said stream of oil from said inlet feed jet for repetitively altering the flow direction of said hot oil stream supplied by said inlet feed jet and for agitating the oil bath under said feed jet to substantially eliminate dead oil zones.

15. Apparatus as claimed in claim 13, wherein each of said first and second flow directing means comprises a shaft, means rotatably mounting said shaft between said side walls of said pan, a plurality of fin means mounted at spaced locations on said shaft at preselected non-normal angular orientations to the axis thereof, and means for producing a repetitive rotation of said shaft and said fin means thereon.

16. Apparatus as claimed in claim 15, wherein said fin means comprise substantially circular disks mounted to said shaft at substantially similar non-normal angular orientations to the axis thereof and being substantially coaxial therewith.

17. Apparatus as claimed in claim 13, wherein said first flow directing means comprises a shaft, means rotatably mounting said shaft between said side walls of said pan at a location above the surface of said volume of hot oil, a plurality of substantially circular disks mounted coaxially on said shaft at space locations and at preselected non-normal angular orientations to the axis thereof, and means for rotating said shaft and said circular disks mounted thereon, said circular disks each having a radius of a magnitude preselected to cause substantial surface area of said disk to extend through said volume of oil as said disks rotate with said shaft; and said second flow directing means comprises a shaft, means rotatably mounting said shaft between said walls of said pan at a location underneath the bottom of said inlet feed jet, a plurality of substantially circular disks mounted coaxially on said shaft at preselected spaced locations and preselected non-normal angular orientations to the axis thereof, and means for rotating said shaft and said circular disks thereon, each of said circular disks having a radius of a magnitude sufficient to extend substantial surface portions of said disks into said stream of hot oil from said inlet feed jet as said disks rotate with said shaft.

18. Apparatus as claimed in claim 14, further comprising a third flow directing means mounted behind said first flow directing means for repetitively altering the localized flow direction of said volume of hot oil thereat, thereby to maintain agitation of said flow of hot oil passing therethrough and improved movement of product pieces through the zone of said third flow directing means.

19. Apparatus as claimed in claim 18, wherein said third flow directing means comprises a shaft, means rotatably mounting said shaft between said side walls of said pan at a location above the surface of said volume of hot oil, a plurality of substantially circular disks mounted coaxially on said shaft at spaced locations and a preselected non-normal angular orientation to the axis thereof, and means for rotating said shaft and said circular disks mounted thereon, said circular disks each having a radius of a magnitude preselected to cause substantial surface area of said disk to extend through said volume of oil as said disks rotate with said shaft.

* * * * *